United States Patent [19]

Sauber

[11] Patent Number: 4,572,692
[45] Date of Patent: Feb. 25, 1986

[54] POSITIVE DRIVE POSITIONING COLLAR

[76] Inventor: Charles J. Sauber, 10 N. Sauber Rd., Virgil, Ill. 60182

[21] Appl. No.: 680,929

[22] Filed: Dec. 12, 1984

[51] Int. Cl.$^4$ .......................... B25G 3/00; F16D 1/00
[52] U.S. Cl. ...................................... 403/16; 403/21; 403/324; 242/68.4; 242/58.6
[58] Field of Search ................... 403/324, 374, 21, 16, 403/379, 358; 242/68.4, 58.6, 129.51, 79

[56] References Cited

U.S. PATENT DOCUMENTS

| | | | |
|---|---|---|---|
| 783,762 | 2/1905 | Stahl | 403/358 |
| 1,818,720 | 8/1931 | Lamatsch | 242/58.6 |
| 1,869,569 | 8/1932 | Lang | 242/58.6 |
| 3,301,499 | 1/1967 | Ewing | 242/68.4 |
| 4,339,212 | 7/1982 | Sauber | 403/27 |

FOREIGN PATENT DOCUMENTS 26300  3/1884  Fed. Rep. of Germany ...... 403/358

Primary Examiner—Andrew V. Kundrat
Attorney, Agent, or Firm—Leydig, Voit & Mayer, Ltd.

[57] ABSTRACT

A positioning collar clamping device comprising, a generally rectangular body member having a projecting portion, said member being adapted to receive a shaft through a central longitudinal opening therein, means defining a first transverse opening through said member and overlappingly intersecting with said shaft receiving longitudinal opening, a lock pin adapted to movably fit within said first transverse opening having first and second ends, said first end having a threaded surface and said second end being adapted to affect an interference fit with said shaft disposed within said longitudinal opening when said lock pin is moved in a first direction, while moving said pin in a second direction reduces and eliminates the interference fit, means defining a slot at one end of said first transverse opening, and captive nut means threadably receptive of said first end of said lock pin, said captive nut means being positioned in said slot so as to be axially immovable in relation to said first transverse opening so that when said captive nut means is rotated in one direction said lock pin is positively driven in a first direction and when said captive nut means is rotated in the other direction said lock pin is positively driven in a second direction.

7 Claims, 6 Drawing Figures

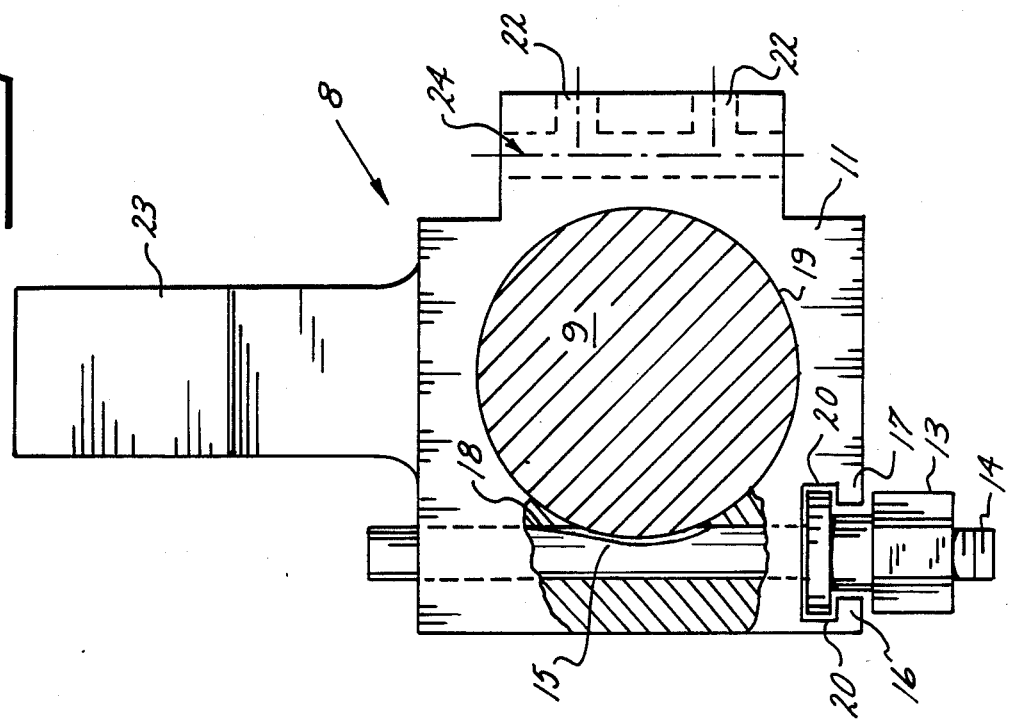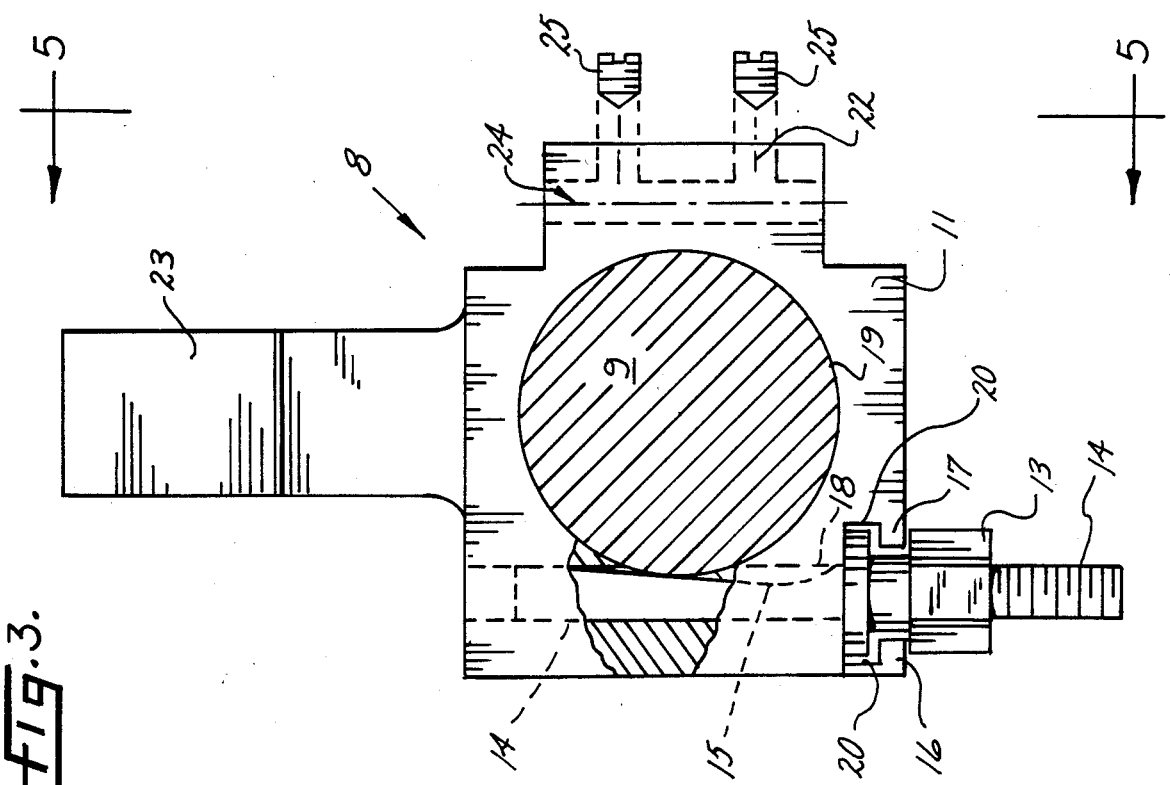

POSITIVE DRIVE POSITIONING COLLAR

TECHNICAL FIELD

The present invention relates generally to clamping collars for cylindrical shafts and more particularly to a positive drive wedge lock clamping collar which is safe, convenient and simple to securely lock the collar in any position on a cylindrical shaft without undesirably scoring the shaft or requiring special tools, loose parts or surfaces.

BACKGROUND ART

The present positioning collar invention is particularly suitable for use in, for example, a high tension cable stringing apparatus such as that described in U.S. Pat. No. 4,339,212. In operation, clamping devices may be placed in abutting relationship to the cable reel of such an apparatus for the purpose of preventing the cable reel from sliding axially on the shaft in an undesirable manner.

In high tension wire stringing, wire discharged from a cable reel, at a desired and controlled rate, is strung across utility poles. During stringing, if any axial movement of the cable reel occurs it can cause horizontal flapping of the high tension wire as it is being discharged from the cable reel. Flapping of the wire being put up can result in contact with existing wire and even breakage thereof, possibly causing great harm to persons and property.

It has thus been an objective of the art to devise clamping devices that will eliminate this axial movement of the cable reel and the resultant wire flapping while, in addition, enabling easy loading and unloading of the cable reel or spool when the wire thereon has been expired. The commonly known clamping devices heretofore utilized have been collar-like structures provided with arrangements of a plurality of set screws that permit adjustable fixing with respect to the axle. There are numerous disadvantages and shortcomings which have been encountered with the set-screw devices. For example, the set screws may get separated from the clamping body or, because they have to be tightened and loosened with a wrench, corroded or damaged threads may impair the ability to secure or release the set screws. Moreover, because each of the plurality of set screws must be tightened and loosened, changing the cable reels during operation is slow and tedious and generally undesirable. Similar problems have been encountered with split collar clamping devices utilizing nuts and bolts to clamp them to the shaft.

A solution of these problems was presented by the clamping device of my prior application Ser. No. 939,243, filed 9/5/78 now abandoned, in that it was easily mounted on, removed from and positioned on an axle supporting a cable reel, as well as being fairly inexpensive to manufacture and devoid of separable parts. This was achieved by an annular collar having a central longitudinal opening adapted to receive an axle or shaft and an intersecting transverse opening which received a shiftable, captively mounted lock pin. The lock pin had a tapered surface portion which when moved in one direction affected an interference fit with the shaft and when moved in the opposite direction formed a clearance allowing the collar to be moved easily along the shaft. Other similar devices are found to have been disclosed in German Pat. No. 671,920; U.S. Pat. Nos. 1,408,993; 2,627,431; 302,519; 291,728; 1,458,802, 2,785,814; and Swedish Pat. No. 124,927, all cited in the file of my abandoned application Ser. No. 939,243.

However, problems arose in connection with proper use and safety aspects of the wedge locking type collars. Personnel in the field applying hammers and the like to pound the lock pin in one direction or the other would lose sight of the proper side to strike for unlocking, and excessive striking in the wrong direction led to flaring or chipping of the lock pin and even in the sending off of flying pieces. Excessive wedging beyond that necessary brought about similar actions to then drive the pin in the opposite direction for unlocking. Therefore, I developed an improved clamping collar wherein the locking pin has provision for eliminating the flairing and chipping of ends by severe hammer blows (Sauber U.S. Pat. No. 4,339,212). Despite the features of this collar, however, there could still be possible dangers occasioned by swinging a hammer to drive and loosen the locking pin, and excessive wedging of the locking pin beyond that necessary might still occur. More importantly, however, workers find discomfort and fatigue in holding and carrying the heavy hammers used for operating clamping collars requiring striking action to tighten and loosen.

SUMMARY OF THE INVENTION

It is a primary object of the present invention to provide an improved clamping collar which is more convenient and safer to use.

It is another object of the present invention to provide such an improved collar which is easy, and therefore not time-consuming, to remove from a reel support shaft.

A further object of the present invention is to provide an improved clamping collar having very few detachable parts.

Other objects and advantages of the invention will be apparent from the following detailed description.

BRIEF DESCRIPTION OF THE DRAWINGS

FIG. 3 is a sectional plan view taken along the line 3—3 in FIG. 2 illustrating the clamping lock pin of the present invention in the locked position;

FIG. 4 is a sectional plan view illustrating the clamping lock pin in the unlocked position.

DESCRIPTION OF THE PREFERRED EMBODIMENT

While the invention will be described in connection with a particular preferred embodiment, it will be understood that it is not intended to limit the invention to that particular embodiment. On the contrary, it is intended to cover all alternatives, modifications and equivalents as may be included within the spirit and scope of the invention as defined by the appended claims.

Figure 1:
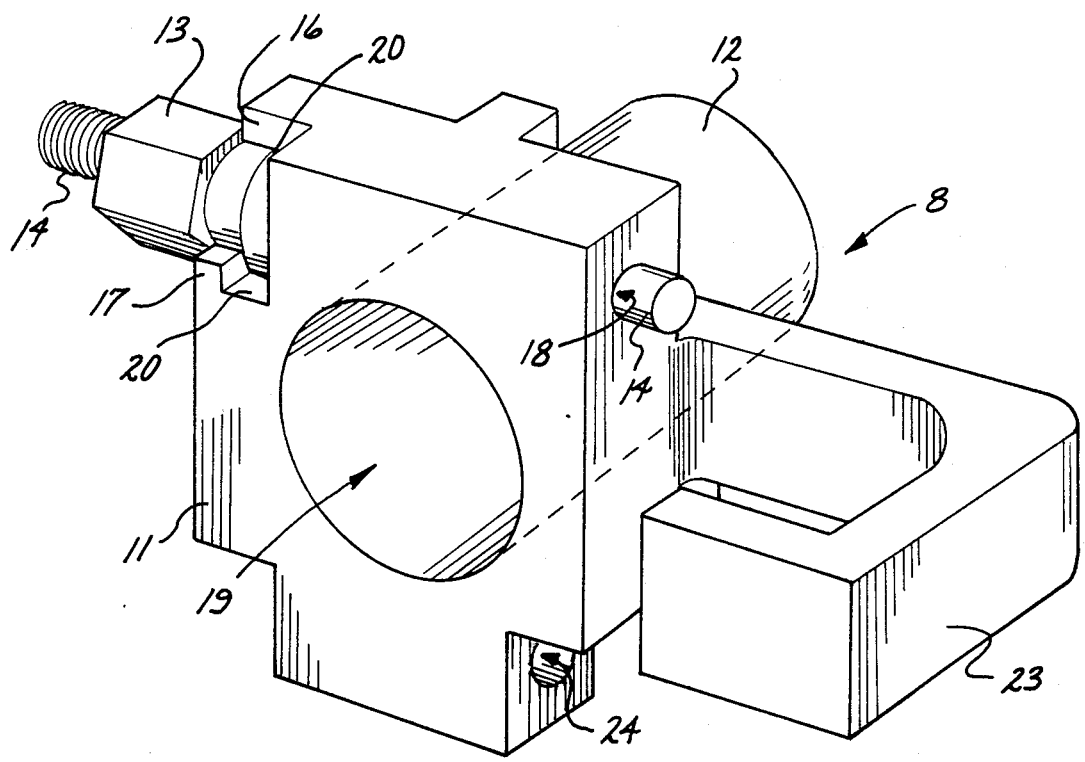
FIG. 1 is a perspective view of a positive drive positioning collar embodying the present invention.
Figure 2:
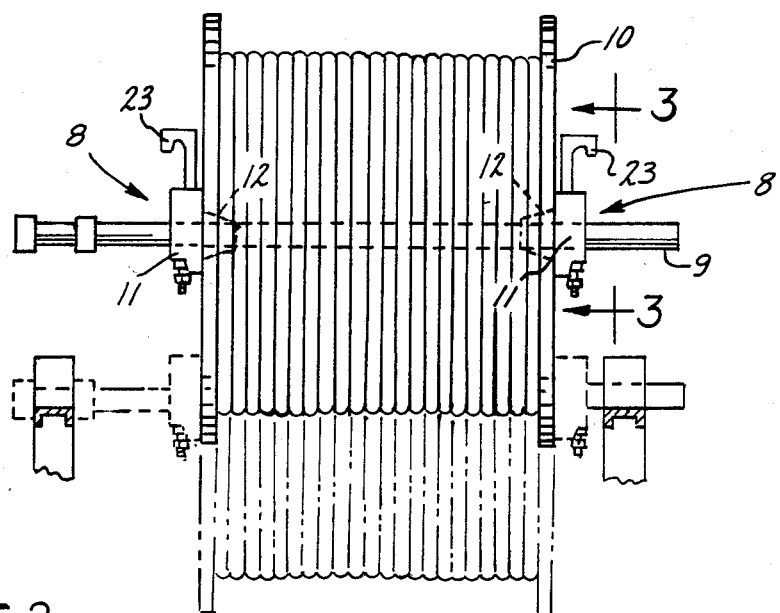
FIG. 2 is a fragmentary side plan view of the axle-cable reel assembly to which the positioning collar of the present invention is affixed.

Turning now to the drawings, and referring first to FIG. 1, there is shown a collar clamping device 8 constructed in accordance with the invention to clamp an axle 9 of a cable reel device of the type described in U.S. Pat. No. 4,339,212. As illustrated in FIG. 2, two such collar clamping devices 8 are positioned on said axle in a manner which prevents axial movement of the cable reel 10.

Figure 5B:
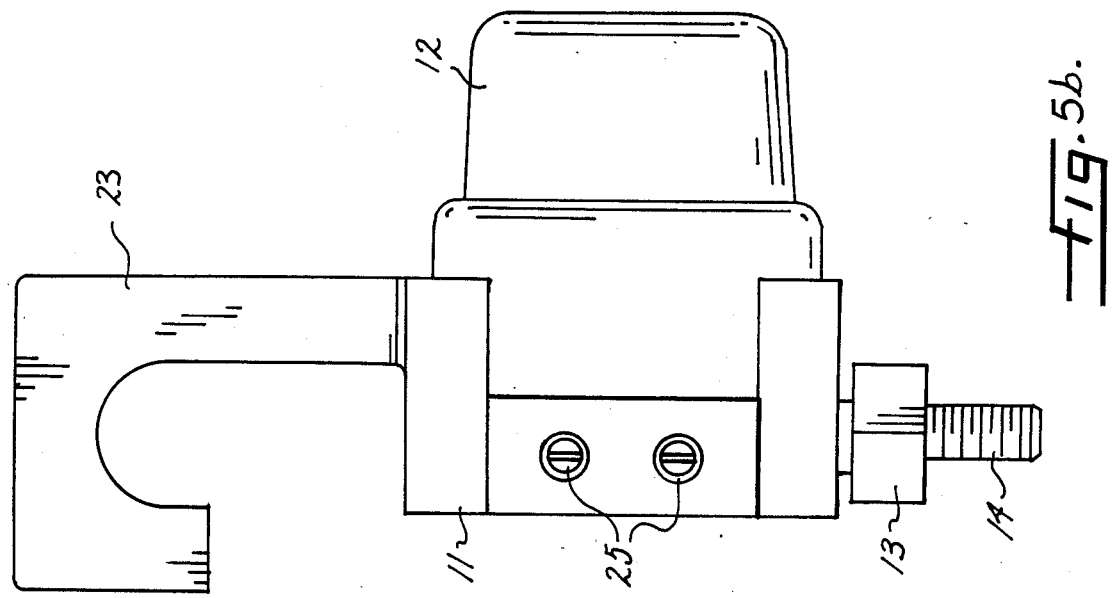
FIG. 5b is a side plan view of the positioning collar taken along the line 5—5 in FIG. 3 illustrating a stepped projecting portion.
Figure 5A:
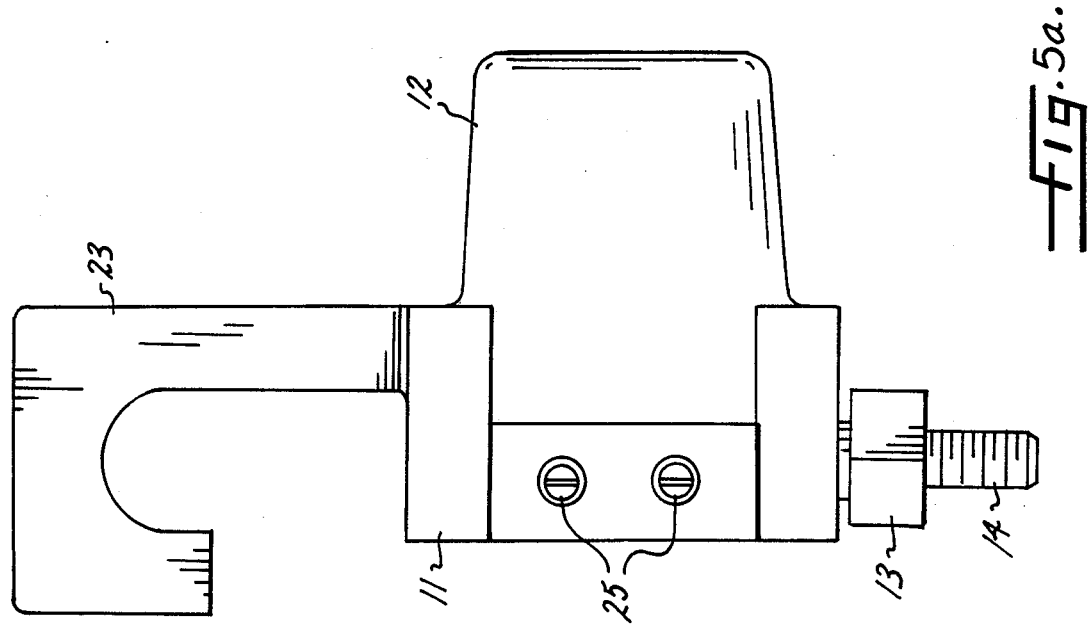
FIG. 5a is a side plan view of the positioning collar taken along the line 5—5 in FIG. 3 illustrating a tapered projecting portion.

The collar clamping device 8, in accordance with the present invention, comprises a body member 11 having a projecting portion 12 adapted to fit in the longitudinal opening of cable reel 10 and a central longitudinal opening 19 adapted to receive the axle 9. Projecting portion 12 is either tapered or stepped (see FIGS. 5a and 5b) so that it fits snugly into cable reels longitudinal openings of various diameters. The body member 11 includes a first transverse opening 18 which intersects with and partially overlaps longitudinal opening 19. A lock pin 14 is disposed within this first transverse opening and is captivated therein as herein explained.

In order to effect the desired wedging between the collar and axle 9, the lock pin 14 has a substantially flat tapered surface 15 facing the longitudinal opening 19 in the body member 11 and the axle 9. The tapered surface is dimensioned so that as the lock pin is moved in a first direction, the lock pin will affect a frictional interference fit with the axle, thereby locking the clamping device to the axle in the selected location on the axle. As the lock pin is moved in a second direction, the lock pin and axle form a clearance therebetween so that the clamping collar may be moved easily along the axle. Thus, as may readily be seen in FIG. 3, as the lock pin 14 is moved from top to bottom, the tapered surface 15 affects an interference fit with the axle 9 thereby holding the clamping device to the axle at the selected location. Conversely, as the lock pin is moved from bottom to top (FIG. 4), a clearance is formed between the lock pin and the axle so that the clamping collar may be moved easily along the axle. As an alternative, it will be noted that the pin could be tapered such that the interference is affected when the lock pin moves from bottom to top, and the clearance is formed as the pin moves from top to bottom.

As can be readily appreciated by those skilled in the art, the clamping device described herein may be positioned anywhere on the axle and thus will be suitable for use with any cable reel in order to limit the axial movement of the cable reel, thereby preventing horizontal flapping of the high tension wire during discharge.

In accordance with one important aspect of the present invention, the lock pin 14 is smooth over half of its surface, while the other half is threaded so as to accommodate an internally threaded piece, such as a nut. As viewed in the embodiment illustrated in FIGS. 3 and 4, the upper half of the lock pin (i.e., the half having the tapered surface 15) has a smooth surface, while the lower half is threaded. A captive nut means 13 having internal threads is threaded onto the lower half of the lock pin. The captive nut means illustrated in FIGS. 1, 3 and 4 has three distinct surface sections; a first surface section on one end having a square, hexagonal or other convenient cross section which accommodates a wrench or ratchet, a second surface section on the opposite end which is smooth and forms a flange, and a third surface section located between the other two sections which is smooth and has a smaller circumference than the other two sections so as to form a groove therebetween. This particular embodiment of the captive nut means could be manufactured by milling a square or hexagonal stock piece having internal threading.

In accordance with another aspect of the invention, the body member 11 has L-shaped extension 16 and tooth 17 which form a slot 20 at one end of first transverse opening 18. This slot is T-shaped and is dimensioned to accommodate captive nut means 13 as shown in FIGS. 1, 3 and 4. The flange section of captive nut means 13 fits into T-shaped slot 20, while extension 16 and tooth 17 of the body member fit into the grooved section of captive nut means 13. Therefore, when captive nut means 13 is positioned in slot 20 and lock pin 14 is threaded therethrough, the lock pin maintains the captive nut means in axial alignment with transverse opening 18, and extension 16 and tooth 17 abut the flange section of captive nut means 13, thereby captivating the nut/lock pin combination in transverse opening 18.

In operation, captive nut means 13 is turned using a wrench or ratchet. Since captive nut means 13 is captivated in slot 20, this turning, depending upon its direction, causes lock pin 14 to be positively driven upward or downward in first transverse opening 18, thereby affecting a clearance or an interference fit, respectively, with the axle 9, as described previously.

The body member 11 of the present invention further comprises lifting hook means 23. The lifting hook means 23 is preferably shaped in the form of a J, and is located on the side of the body member 11 opposite the side wherein slot 20 is located (see FIG. 1). Thus, as may readily be seen in FIG. 2, when clamping collars 8 are properly fastened to axle 9, lifting hook means 23 protrude upwardly therefrom so that the entire axle/reel/collar combination can be safely lifted by means of a winching device utilizing cables or chains.

The body member 11 also includes a second transverse opening 24. Unlike first transverse opening 18, second transverse opening 24 does not intersect longitudinal opening 19. Rather, as may readily be seen in FIG. 3, second transverse opening 24 intersects two threaded holes 22 which are receptive of set screws 25. Accordingly, a ground wire (not shown) can be fed through opening 24 and can be held therein by set screws 25, thereby allowing for dissipation of any electrical current in the clamping collar 8 or the axle 9.

FIGS. 1-5b herein illustrate an embodiment of the present invention wherein the body member 11 includes lifting hook means 23 and second transverse opening 24. It will be noted, however, that alternate embodiments of the present invention are possible wherein either of these features or both of the features are excluded.

As can be seen from the foregoing detailed description, this invention provides an improved positioning collar having a lock pin which is positively driven in either direction by the turning of captive nut means. This collar is safe and convenient to use, and can be easily and quickly removed from a reel support shaft. Furthermore, this collar has very few detachable parts which are susceptible to being lost.

What is claimed is:

1. A positioning collar clamping device comprising:
    a body member having a projecting portion, said member being adapted to receive a shaft through a central longitudinal opening therein;
    means defining a first transverse opening through said member and overlappingly intersecting with said shaft receiving longitudinal opening;

a lock pin adapted to movably fit within said first transverse opening having first and second ends, said first end having a threaded surface and said second end being adapted to affect an interference fit with said shaft disposed within said longitudinal opening when said lock pin is moved in a first direction, while moving said pin in a second direction reduces and eliminates the interference fit;

means defining a slot at one end of said first transverse opening;

captive nut means threadably receptive of said first end of said lock pin, said captive nut means being positioned in said slot so as to be axially immovable in relation to said first transverse opening so that when said captive nut means is rotated in one direction said lock pin is positively driven in a first direction and when said captive nut means is rotated in the other direction said lock pin is positively driven in a second direction; and lifting hook means provided on said body member by which said collar and said shaft extending therethrough can be lifted.

2. A positioning collar clamping device comprising:

a body member having a projecting portion, said member being adapted to receive a shaft through a central longitudinal opening therein;

means defining a first transverse opening through said member and overlappingly intersecting with said shaft receiving longitudinal opening;

a lock pin adapted to movably fit within said first transverse opening having first and second ends, said first end having a threaded surface and said second end being adapted to affect an interference fit with said shaft disposed within said longitudinal opening when said lock pin is moved in a first direction, while moving said pin in a second direction reduces and eliminates the interference fit;

means defining a slot at one end of said first transverse opening;

captive nut means threadably receptive of said first end of said lock pin, said captive nut means being positioned in said slot so as to be axially immovable in relation to said first transverse opening so that when said captive nut means is rotated in one direction said lock pin is positively driven in a first direction and when said captive nut means is rotated in the other direction said lock pin is positively driven in a second direction; and wire retention means provided on said body member, said means defining a second transverse opening adapted to receive and retain a ground wire.

3. The positioning collar clamping device of claim 1 or 2 wherein said second end of said lock pin is adapted to affect an interference fit by having a flat tapered surface.

4. The positioning collar clamping device of claim 1 or 2 wherein said captive nut means comprises an internally threaded nut having three distinct surface areas: a first surface area whose cross-sectional shape is accommodative of a wrench, a second surface area comprising a smooth flange, and a third surface area located between said first and second surface areas which is smooth and has a smaller circumference than said first and second surface areas so as to form a groove therebetween.

5. The positioning collar clamping device of claim 4 wherein said slot defining means comprises at least one L-shaped extension positioned such that its free end projects into said groove formed between said first and second surface areas of said captive nut means when said captive nut means is positioned at one end of said first transverse opening.

6. The positioning collar clamping device of claims 1 or 2 wherein said projecting portion of the body member is tapered.

7. The positioning collar clamping device of claims 1 or 2 wherein said projecting portion of the body is stepped.

* * * * *